T. MAYHEW.
Feeder for Lamps

No. 37,404.

Patented Jan. 13, 1863.

Witnesses
Lemuel W. Serrell
Thos. Geo. Harold

Inventor
Therpulus Mayhew

UNITED STATES PATENT OFFICE.

THEOPILUS MAYHEW, OF POUGHKEEPSIE, NEW YORK.

IMPROVEMENT IN FEEDERS FOR LAMPS.

Specification forming part of Letters Patent No. 37,404, dated January 13, 1863.

*To all whom it may concern:*

Be it known that I, THEOPILUS MAYHEW, of Poughkeepsie, in the county of Dutchess and State of New York, have invented, made, and applied to use a certain new and useful Improvement in Feeders for Lamps; and I do hereby declare the following to be a full, clear, and exact description of my said invention, reference being had to the annexed drawings, making part of this specification, wherein—

Figure 2:
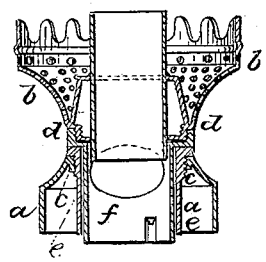
Figure 1:
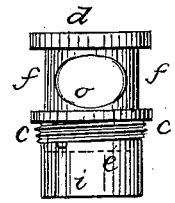

Figure 1 is an elevation of my feeder; and Fig. 2 is a section of the same as in a lamp ready for use.

Similar marks of reference denote the same parts.

In order to allow of the introduction of the oil or other material into the reservoir of a lamp, it has been usual heretofore to unscrew the burner. I provide for this by means of a portable and intermediate thimble, into which the burner screws, and which screws into the ring or collar of the lamp-reservoir, said intermediate thimble being divided, so that the lamp can be fed between the two parts without either being disconnected from the burner or from the reservoir.

In the drawings, $a$ represents the screw-collar that is affixed to the reservoir or receptacle for the material to be burned. $b$ is the burner, of any usual or desired construction. $c$ is a screw-socket taking the collar $a$; and $d$ is a screw-socket taking the burner. Affixed to the socket $c$ is a guide-pipe, $e$, that contains the sliding tube $f$. This tube $f$ should have a projection taking a slot, $i$, in the tube $e$, whereby the tube $f$ is prevented from drawing out of the tube or pipe $e$. The tube $f$ is attached to the socket $d$, and has an opening, $o$, in its side. It will now be seen that when the burner is raised the tube $f$ is drawn up as in Fig. 1, and the hole $o$ comes above the socket $c$, and thereat a spout or pipe from a can or feeder may be introduced whenever it is desired to fill the lamp, this device avoiding the unscrewing operation now usual, and keeping the burner and lamp properly together, at the same time not preventing them being unscrewed as heretofore when necessary. The screw-sockets $c$ and $d$ form an intermediate thimble between the collar $a$ and burner $b$ and connect the respective parts together, at the same time allowing the lamp to be filled without unscrewing the burner. It will be evident that this device is applicable to any ordinary lamp, and does not require the burner to be specially constructed so as to contain the feeding-tube.

What I claim, and desire to secure by Letters Patent, is—

The screw-thimble formed by the sockets $c$ and $d$, applied between the burner and the collar on the lamp in the manner specified, whereby said burner and lamp are connected, but the lamp-burner can be raised for filling the reservoir without unscrewing the burner, as specified.

In witness whereof I have hereunto set my signature this 1st day of August, 1862.

THEOPILUS MAYHEW.

Witnesses:
LEMUEL W. SERRELL,
CHAS. H. SMITH.